United States Patent Office 3,846,141
Patented Nov. 5, 1974

3,846,141
JET PRINTING INK COMPOSITION
Dale G. Ostergren, Evanston, and Daniel M. Zabiak, River Grove, Ill., assignors to A. B. Dick Company, Niles, Ill.
No Drawing. Continuation of abandoned application Ser. No. 95,953, Dec. 7, 1970. This application July 27, 1972, Ser. No. 275,572
Int. Cl. C09d 11/00
U.S. Cl. 106—22    11 Claims

ABSTRACT OF THE DISCLOSURE

An ink composition for use in jet printing comprising an aqueous solution of a water-soluble dye and a humectant system formed of a mixture of a lower alkoxytriglycol and at least one other compound selected from the group consisting of a polyethylene glycol, a lower alkyl ether of diethylene glycol and glycerol.

---

This is a continuation of application Ser. No. 95,953, filed Dec. 7, 1970, now abandoned.

This invention relates to printing inks, and more particularly to a new and improved printing ink for use in jet printing.

In Technical Report No. 1722-1 of the Stanford University Electronics Research Laboratory, dated March 1964 and entitled "High Frequency Oscillography With Electrostatically Deflected Ink Jets," description is made of the early work which was done in what is now known to the art as jet printing. The basic imaging technique in jet printing involves the use of one or more ink jet assemblies connected to a pressurized source of ink. Each ink jet includes a very small orifice, usually having a diameter of the order of about 0.0024 inches, which is electromagnetically energized by magneto restrictive or piezo-electric means to emit a continuous stream of uniform droplets of ink at a rate of the order of 33 to 75 kilohertz. The stream of droplets is directed onto the surface of a moving web of, for example, paper, and is controlled to form printed characters in response to video signals derived from an electronic character generator and in response to an electrostatic deflection system.

In the early work relating to jet printing described in the above report, use was made of various types of commercially available fountain pen inks. However, generally available inks are unsuitable for use in jet printing because they frequently contain solid particles of the dye contained in the ink which frequently clog the very small orifice of the ink jet.

Perhaps more importantly, commercially available inks have a tendency to "tip dry" when left in the ink jet over short periods, such as overnight when the jet printer is not in use, with the result that the ink which dries in the orifice deposits solids therein to clog the orifice and prevent the flow of ink therethrough on resumption of operation of the jet printer.

It is known that humectants, such as glycerine, can be added to inks in general in order to minimize undesired drying of the ink. However, the use of this technique is unsuitable for jet printing inks because glycerin has a high viscosity of the order of 900 centipoise and therefore cannot be used as the sole humectant in amounts sufficient to prevent undesired tip drying of jet printing inks without increasing the viscosity of the ink to the extent it will not flow through the jet properly. This problem is further compounded by the fact that jet printing inks are generally recirculated in a jet printer whereby the ink is continually subjected to a water loss through evaporation, to thereby further increase the viscosity of the jet printing ink.

It is accordingly an object of the present invention to provide a new and improved printing ink suitable for use in jet printers which overcomes the aforementioned disadvantages.

It is a more specific object of the invention to provide a new and improved jet printing ink containing a humectant system which does not adversely affect the viscosity of the ink, even after loss of water from the ink.

It is a further object of the invention to provide a new and improved jet printing ink system which contains essentially no solid particles which would serve to clog the orifice.

It is yet another object of the invention to provide a new and improved jet printing ink system which is compatible with resinous systems whereby the ink is capable of modification to provide a multiple copy ink.

The concepts of the present invention reside in a new and improved ink composition suitable for use in jet printing comprising an aqueous solution of a water-soluble dye and a humectant system formed of a mixture of a lower alkoxy triglycol, and preferably methoxy triglycol or ethoxy triglycol, and at least one other water-soluble humectant. It has been found that printing inks formulated in accordance with this invention have the desired viscosity for use in jet printing, and that the viscosity of the composition is subject to little variation with use as water is lost by evaporation during recirculation of the ink composition through the jet printer. In addition, the humectant system of this invention substantially prevents or minimizes tip drying of the printing ink in the orifice or nozzle during down time of the printer, such as when the printer is shut down over night.

As the other water-soluble humectant, use can be made of one or more of any of a number of glycol and glycol compounds. Representative of such materials are polyalkylene glycols (e.g., polyethylene glycols, polypropylene glycols), propylene glycol, lower alkyl ethers of ethylene glycol or diethylene glycol (e.g., ethylene glycol methyl ether, ethylene glycol ethyl ether, diethylene glycol methyl ether, diethylene glycol ethyl ether, etc.), glycerine, etc.

The preferred other water-soluble humectants for use with the alkoxy triglycol in accordance with this invention are the polyalkylene glycols, and preferably a normally liquid polyethylene glycol having an average molecular weight up to about 600, or a polypropylene glycol having an average molecular weight up to about 425. The primary criterion which should be used as a guide in formulating a jet printing ink in accordance with the practice of the invention is that the humectant system not increase the viscosity of the ink composition beyond the range of about 1.0 to 10.0 centipoise at 25° C., and preferably 1.0 to 5.0 centipoise. For this purpose, the most preferred polyalkylene glycols are the polyethylene glycols having an average molecular weight of about 200. As will be appreciated by those skilled in the art, the viscosity of the ink composition will vary somewhat with the nature of the jet printing apparatus, and particularly the pressure of the ink jet.

The relative proportions of the glycol and/or glycerol humectant and the alkoxytriglycols are not critical, and can be varied within fairly wide ranges. However, it is essential to the practice of the invention that the humectant system include both the glycol or glycerol and the alkoxytriglycol. It has been unexpectedly found that in spite of the chemical similarity between these components, an alkoxytriglycol alone is unsuitable for use as a humectant in jet printing ink compositions. For best results, use should be made of the other humectant and the alkoxytriglycol in a weight ratio of about 0.1 to 3.0 and preferably 0.5 to 1.5.

The total amount of the humectant mixture employed in the ink composition of the present invention can be varied within wide limits as dictated by the viscosity considerations of the ink composition as discussed above. As will be appreciated by those skilled in the art, the amount of the humectant system employed depends somewhat on the average molecular weight of the components employed. In general, use is made of the humectant system of the invention in an amount within the range of 5 to 40% by weight of the total composition, and preferably 7 to 25% by weight.

As the coloring material in the ink composition of the invention, use should be made of a water-soluble dye or mixture of dyes. The use of pigments or other forms of particulate matter is preferably avoided since such materials tend to clog the very small orifice of the jet printer. Preferred dyes of the present invention are the commercially available direct dyes which generally contain an ionizable inorganic salt, such as Glauber salts, or sodium chloride which has been added during manufacture in order to standardize the dye lot. The inorganic material thus renders the dye conductive whereby the ink jet is capable of being deflected in an electromagnetc field during jet printing. Such direct dyes are well known to those skilled in the art and are commercially available, as represented by the C.I. direct black 38 dyes (e.g., capable of being deflected in an electromagnetic field Direct Black GW marketed by the Tenneco Color Division of Tenneco Chemicals and Capamine Black ESA marketed by the Capital Color and Chemical Co.). Such dyes are available in a number of colors, any one or more of which can be used in the practice of the invention. If use is made of a pure dye containing no ionizable salt, the desired conductivity can be achieved by adding 0.5% ionizable salt, such as one of the types described, to the composition. For a further description of such well known dyes, reference can be made to the *Color Index,* published by the Society of Dyes and Colorists in cooperation with the American Association of Textile Chemists and Colorists (1957).

The quantity of water-soluble dye in the ink composition is not critical and should be an amount sufficient to provide a printed image with the desired color intensity. For this purpose, use should be made of a water-soluble dye or dyes in an amount constituting between 0.5% to 7% by weight of the total ink composition, and preferably 1–4% by weight. Normally, the desired conductivity is obtained where the composition contains up to 2% by weight of an ionizable salt.

By way of modification, the ink composition of the invention can be formulated to include a base, such as lower alkanolamine, monovalent hydroxides (e.g., alkali metal hydroxides), NH$_4$OH or morpholine in order to maintain the pH of the ink composition above about 9, and preferably above 10. It has been found that the base enables the ink composition of this invention to be modified by incorporation with a resinous system, such as a modified styrene-maleic anhydride resin, in the preparation of a multiple copy ink as described in copending application Ser. No. 95,952, now abandoned filed concurrently herewith and entitled "Offset Jet Printing Ink." Thus, the presence of the base ink composition of this invention is believed to adjust the pH of the ink composition to the alkaline side whereby the ink composition is compatible with the basic resin.

As the base, use a preferably made of monoethanolamine or ammonium hydroxide although other alkanolamines, such as diethanolamine, propanolamine, isopropanolamine, di-isopropanolamine, etc. can also be employed. The amount of the base employed is not critical, and should be an amount sufficient to raise the pH of the ink composition to a pH of at least 9, and preferably to at least 10. In general, amounts of the base within the range of 1–15% by weight, and preferably 2–10% by weight, based on the total weight of the composition.

In accordance with the preferred embodiment of the invention, the jet printing ink composition is formulated to include a solubilizing agent in order to insure that the water-soluble dye or dyes remain in solution in the aqueous vehicle. The preferred solubilizing agent is N-methyl-2-pyrrolidone, although a variety of other well known equivalent solubilizing agents including, for example, $\beta,\beta'$-dihydroxyethyl sulfide (Kramefax-Union Carbide), N-vinylpyrrolidone, substituted pyrrolidone (Solvofen HM—GAF), 4 - methoxy-4-methyl-pentanone-2 and tetrahydrofurfuryl alcohol.

The amount of the solubilizing agent employed is not critical, and depends somewhat on the amount of water-soluble dye employed as well as, to a lesser degree, the nature of the dye. Generally, the solubilizing agent is used in amounts up to about 5% by weight, and preferably 0.5% to 4% by weight, based on the total weight of the composition.

Where the ink composition of the present invention may be stored for prolonged periods prior to use, it is possible and frequently desirable to formulate the ink composition to include a preservative to inhibit growth of bacteria during storage, which might otherwise serve to clog the orifice of the jet printer. Various preservatives are known to be useful for this purpose. Preferred is 6-acetoxy-2,4-dimethyl-m-dioxane which is marketed under the trademark, Dioxin. The amount of the preservative is generally less than 1%, and preferably an amount within the range of 0.005% to 0.5% by weight, based on the total weight of the ink composition.

The ink composition of the present invention can be prepared by thoroughly mixing the components to insure uniform mixing and complete dissolution of the water-soluble dye, and then filtering the resulting composition to remove any particulate contamination. As will be apparent to those skilled in the art, filtration of the composition after mixing the components is highly desirable in order to remove from the ink composition particulate matter, such as contamination or undissolved dye, which might otherwise serve to clog or obstruct the jet of a jet printer during use. It is frequently preferred to filter the composition of the invention to remove particulate matter having a diameter greater than 2 microns, and preferably 1 micron, to insure that obstruction of the jet of the jet printer will be avoided.

In accordance with the preferred practice of the invention, the water vehicle, the alkoxytriglycol, the other humectant or humectants and the solubilizing agent, when the latter is employed, are first thoroughly mixed in a manner in which the introduction of air into the mixture, or foaming, is substantially completely avoided. After a uniform mixture is obtained, the preservative, when use is made of a preservative, is slowly added, and mixing is continued until a uniform mixture is obtained.

Thereafter, the water-soluble dye is slowly sifted into the resulting mixture while agitation is continued to insure substantially complete dissolution of the dye in the aqueous solution. After dissolution of the dye, the ink composition is filtered until any particulate matter contained therein has a size less than the desired maximum.

Having described the basic concepts of the invention, reference is now made to the following examples which are provided by way of illustration, but not by way of limitation, of the practice of the invention.

EXAMPLE 1

Into a clean Groen kettle equipped with a mixer, there is introduced 161.3 parts by weight deionized water, 9 parts by weight polyethylene glycol having an average molecular weight of 200 ("Carbowax 200" from Union Carbide), 9 parts by weight methoxytriglycol, 12 parts by weight monoethanolamine and 4 parts by weight of N-methyl-2-pyrrolidone. The mixer is adjusted to avoid introduction of air into the liquid, and the resulting mixture is stirred to obtain a uniform solution.

Thereafter, 0.20 parts by weight of 6-acetoxy-2,4-dimethyl-m-dioxane (Dioxin) is poured slowly into the kettle while agitation is continued.

After the Dioxin is uniformly mixed with the liquid in the kettle, 3.0 parts by weight Direct Black GW from Tenneco and 1.5 parts by weight of Capamine Black ESA from Capital Color and Chemical Company are sifted into the kettle using a 20 mesh sieve. Stirring is then continued until all of the direct dyes are dissolved.

After dissolution of the dyes, the Groen kettle is connected to a Hilliard 0.5 micron filter by means of a filtering transfer pump. The contents of the kettle are then filtered from about 2 hours with the effluent from the filter being returned to the kettle.

The resulting ink has the following composition (percentages are expressed in percent by weight).

| | Percent |
|---|---|
| Deionized water | 80.65 |
| Polyethylene glycol (MW 200) | 4.50 |
| Methoxytriglycol | 4.50 |
| Monoethanolamine | 6.00 |
| N-methylpyrrolidone | 2.00 |
| Dioxin | 0.10 |
| Direct Black GW | 1.50 |
| Capamine Black ESA | 0.75 |

EXAMPLE 2

Using the procedure described in Example 1, the following ink composition is prepared:

| | Percent |
|---|---|
| Deionized water | 79.50 |
| Polyethyleneglycol (MW 200) | 5.0 |
| Methoxytriglycol | 5.0 |
| Monoethanolamine | 6.10 |
| N-methylpyrrolidone | 2.10 |
| Direct Black GW | 1.50 |
| Capamine Black ESA | .80 |

EXAMPLE 3

Using the procedure described in Example 1, the following composition is prepared:

| | Percent |
|---|---|
| Deionized water | 82.65 |
| Polyethyleneglycol (MW 200) | 5.10 |
| Ethoxytriglycol | 5.00 |
| Monoethanolamine | 5.50 |
| Direct Black GW | 1.75 |

EXAMPLE 4

Using the procedure described in Example 1, the following ink composition is prepared:

| | Percent |
|---|---|
| Deionized water | 80.45 |
| Polyethyleneglycol (MW 400) | 4.50 |
| Methoxytriglycol | 4.80 |
| Monoethanolamine | 6.00 |
| N-methylpyrrolidone | 2.00 |
| Direct Black GW | 1.50 |
| Capamine Black ESA | 0.75 |

EXAMPLE 5

Using the procedure described in Example 1, the following ink composition is prepared:

| | Percent |
|---|---|
| Direct Black GW | 2.00 |
| Polyethyleneglycol 200 | 5.00 |
| Ethoxytriglycol | 5.00 |
| Dioxin | 0.10 |
| Water | 87.90 |

EXAMPLE 6

Using the procedure described in Example 1, the following ink composition is prepared:

| | Percent |
|---|---|
| Direct Black GW | 2.25 |
| Polyethyleneglycol 200 | 4.50 |
| Methoxytriglycol | 4.50 |
| Monoethanolamine | 6.00 |
| N-methyl-2-pyrrolidone | 2.00 |
| Dioxin | 0.10 |
| Water | 80.65 |

EXAMPLE 7

Using the procedure described in Example 1, the following ink composition is prepared:

| | Percent |
|---|---|
| Direct Black GW | 2.25 |
| Glycerine | 4.50 |
| Methoxytriglycol | 4.50 |
| Monoethanolamine | 6.00 |
| N-methyl-2-pyrrolidone | 2.00 |
| Dioxin | 0.10 |
| Water | 80.65 |

EXAMPLE 8

Using the procedure described in Example 1, the following ink composition is prepared:

| | Percent |
|---|---|
| Direct Black GW | 2.25 |
| Ethoxytriglycol | 10.00 |
| Diethyleneglycolmethyl ether | 5.00 |
| N-methyl-2-pyrrolidone | 1.00 |
| Dioxin | 0.10 |
| Water | 81.65 |

EXAMPLE 9

Using the procedure described in Example 1, the following ink composition is prepared:

| | Percent |
|---|---|
| Direct Black GW | 1.75 |
| Capamine Black ESA | 0.50 |
| Polyethyleneglycol 200 | 6.00 |
| Methoxytriglycol | 6.00 |
| Diethyleneglycolmethyl ether | 6.00 |
| N-methyl-2-pyrrolidone | 2.00 |
| Dioxin | 0.10 |
| Water | 77.65 |

It is apparent from the foregoing that the present invention provides a new and improved ink composition for use in jet printing processes which substantially eliminates the problem of "tip drying" and maintains its desired viscosity over prolonged periods of time. In addition, the ink compositions of the invention have a specific resistivity less than 150 ohm-cm. and thus are well suited for use in jet printing.

It will be understood that various changes and modifications can be made in the details of procedure, formulation and use without departing from the spirit of the invention, especially as defined in the following claims.

We claim:

1. An ink composition consisting essentially of an aqueous solution of 0.5 to 7.0% by weight of a water-soluble direct dye and 5 to 40% by weight of a humectant system formed of a mixture of a lower alkoxy triglycol and at least one compound selected from the group consisting of a polyethylene glycol having an average molecular weight up to about 600, polypropyene glycol having an average molecular weight up to about 425, a lower alkyl ether of ethylene glycol and diethylene glycol, propylene glycol and glycerol, with the weight ratio of the alkoxy triglycol to said compound being within the range of 0.1 to 3.0, the ink composition having a viscosity within the range of 1.0 to 10 centipoise at 25° C. and a specific resistivity less than 150 ohm-cm.

2. A composition as defined in Claim 1 wherein the polyethylene glycol has an average molecular weight up to 600.

3. A composition as defined in Claim 1 wherein the composition has a viscosity in the range of 1.0 to 5.0 centipoise at 25° C.

4. A composition as defined in Claim 1 wherein the alkoxytriglycol is selected from the group consisting of methoxytriglycol, ethoxytriglycol and mixtures thereof.

5. A composition as defined in Claim 1 wherein the weight ratio of alkoxytriglycol to polyethylene glycol is within the range of 0.5 to 1.5.

6. A composition as defined in Claim 1 wherein the composition includes a base selected from the group consisting of alkanol amines, alkali metal hydroxides, ammonium hydroxide and morpholine to maintain the pH of the composition above 9.0.

7. A composition as defined in Claim 6 wherein the base constitutes between 1–15% by weight of the composition.

8. A composition as defined in Claim 1 which includes N-methyl-2-pyrrolidone as a solubilizing agent to maintain the water-soluble dye in solution.

9. A composition as defined in Claim 8 wherein the solubilizing agent constitutes up to 5% by weight of the composition.

10. A composition as defined in Claim 1 which includes 6-acetoxy-2,4-dimethyl-m-dioxane as a preservative to inhibit bacteria growth.

11. A composition as defined in Claim 10 wherein the preservative constitutes up to 1% by weight of the composition.

References Cited

UNITED STATES PATENTS

| | | | |
|---|---|---|---|
| 3,519,443 | 7/1970 | Kaplan et al. | 106—22 |
| 3,477,862 | 11/1969 | Forsyth | 106—22 |
| 3,705,045 | 12/1972 | Nadolski | 106—22 |
| 2,771,372 | 11/1956 | Chambers et al. | 106—22 |
| 2,966,419 | 12/1960 | Anderson | 106—23 |
| 3,346,322 | 10/1967 | Finkenauer et al. | 8—79 |
| 3,314,994 | 4/1967 | Schubert et al. | 8—82 |
| 3,597,244 | 8/1971 | Fookson et al. | 106—22 |
| 3,705,043 | 12/1972 | Zabiak | 106—20 |
| 3,246,997 | 4/1966 | Sumner et al. | 106—22 |

FOREIGN PATENTS

| | | | |
|---|---|---|---|
| 1,215,514 | 12/1970 | Great Britain | 106—22 |
| 1,178,356 | 1/1970 | Great Britain | 8—79 |

JOSEPH L. SCHOFER, Primary Examiner

T. S. GRON Assistant Examiner

U.S. Cl. X.R.
106—20, 29, 30, 31, 32, 311; 8—93

UNITED STATES PATENT OFFICE
CERTIFICATE OF CORRECTION

Patent No. 3,846,141      Dated November 5, 1974

Inventor(s) Dale G. Ostergren and Daniel M. Zabiak

It is certified that error appears in the above-identified patent and that said Letters Patent are hereby corrected as shown below:

IN THE SPECIFICATION:

In column 3, please delete "capable of being deflected in an electromagnetic field", line 24.

Signed and sealed this 1st day of April 1975.

(SEAL)
Attest:

RUTH C. MASON
Attesting Officer

C. MARSHALL DANN
Commissioner of Patents
and Trademarks